T. M. RANEY.
FRUIT GATHERER.
APPLICATION FILED MAY 2, 1914.
1,138,789.
Patented May 11, 1915.
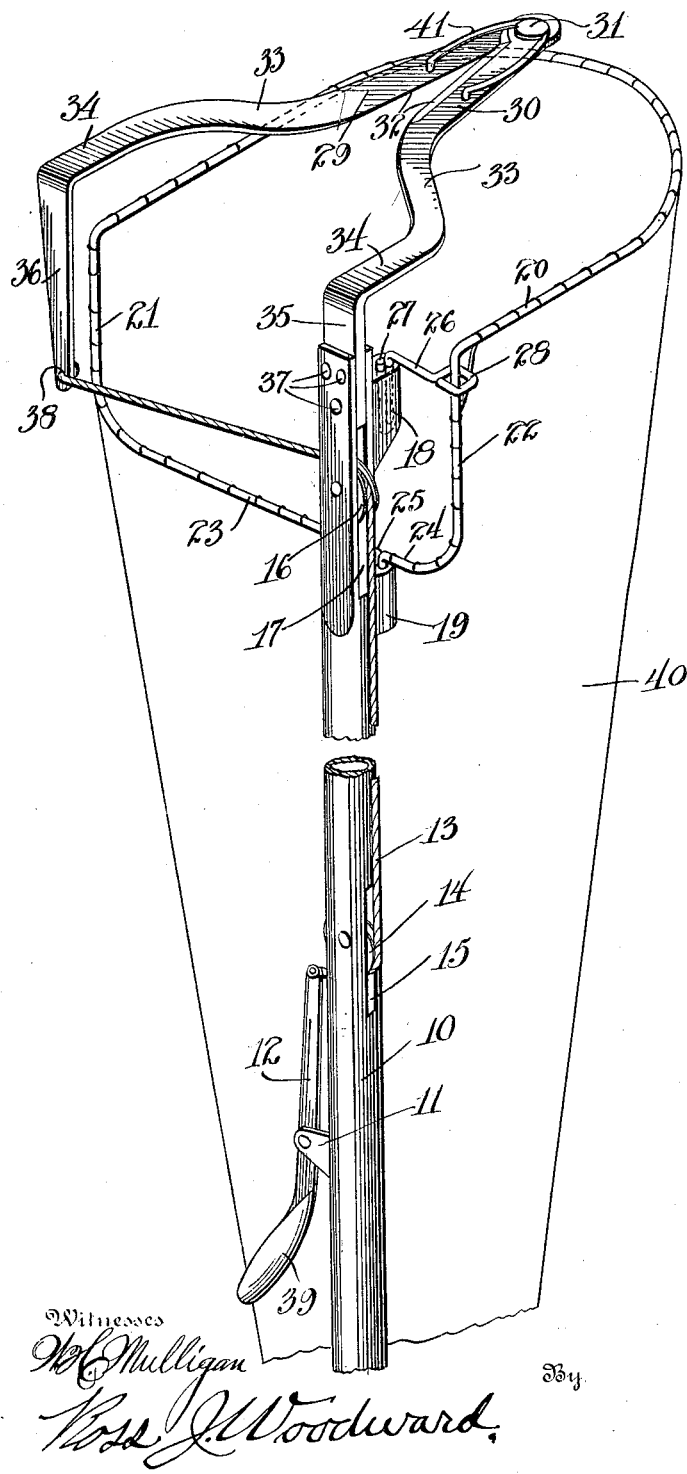

UNITED STATES PATENT OFFICE.

THOMAS M. RANEY, OF LEADVILLE, COLORADO.

FRUIT-GATHERER.

1,138,789.

Specification of Letters Patent.

Patented May 11, 1915.

Application filed May 2, 1914. Serial No. 835,952.

*To all whom it may concern:*

Be it known that I, THOMAS M. RANEY, a citizen of the United States, residing at Leadville, in the county of Lake and State of Colorado, have invented certain new and useful Improvements in Fruit-Gatherers, of which the following is a specification.

This invention relates to a fruit gatherer, and the principal object of the invention is to provide a fruit gatherer having an improved type of handle to which an improved type of cutting apparatus is secured, and to which is also secured an improved type of sack carrying loop or frame.

Another object of the invention is to provide improved means for securing the frame and cutting device to the handle, and to also provide improved operating means for the cutting device.

This invention is illustrated in the accompanying drawing wherein the figure is a perspective view of the improved fruit gatherer, the lower portion of the handle and sack being broken away.

The handle 10 may be of any desired length and is provided at a convenient point with a pivot ear 11 to which the operating lever or trigger 12 is pivotally connected. This lever or trigger 12 is provided so that by pressing the lever, the line 13 may be drawn to operate the cutting device. This line 13 passes around a pulley 14 mounted in the slot 15 and extends up the handle and around an upper pulley 16 mounted in the slot 17 leading from the upper end of the handle. Shoulders 18 and 19 extend from the handle 10 adjacent the upper end and form sockets.

The frame 20 is formed from a single strand of wire which is bent to form a substantial U-shaped structure having its arms 21 and 22 bent downwardly at substantially right angles and being then bent toward each other as shown at 23 and 24. The ends 25 of the arms are bent to form pins which extend into the socket 19 and are either secured therein by any suitable means or may be held therein by frictional engagement with the walls of the socket. If the frictional engagement between the pins 25 and the walls of the socket is depended upon to hold the pins in place, the frame will be made of resilient wire, thus increasing the friction and causing the frame to be securely held in place. A supporting arm 26 has its inner end bent to form a finger 27 which fits into the socket 18 and has its outer end portion bent to form an eye 28 through which the arm 22 passes. It is, of course, obvious that the arm 26 may be formed of resilient wire so that the finger 27 formed by doubling the inner end portion of the brace will be securely held in place.

The cutting device comprises the two jaws 29 and 30 which are pivotally connected by means of the rivet 31 and have their inner edges 32 beveled from opposite sides to form cutting edges. The jaws are carried in diverging relation as shown at 33 and are then carried parallel as shown at 34 and have their free end portions bent downwardly to form the handles 35 and 36. The handle 35 is secured in the slot 17 of the handle 10 by means of the rivets 37 and the handle 36 is provided with an opening 38 through which the line 13 is passed. The end of the line is knotted or otherwise enlarged so that the line can not pass out of the opening 38 when the lever 12 is moved.

In the operation of this fruit gatherer, the handle is grasped with one hand so that it may be held in a raised position with its lower end supported by any suitable device such as a belt or shoulder strap worn by the operator. After the gatherer has been raised to the proper height, it is moved to the proper position so that the fruit will pass between the jaws of the cutting device with the stem of the fruit positioned between the cutting edges 32. The handle 39 of the lever 12 is then pressed toward the handle 10 so that the line 13 will be drawn downwardly, thus closing the jaws of the cutting device and causing the cutting edges to cut through the stem of the fruit in a manner similar to the action of a pair of scissors. When the stem of the fruit is cut, the fruit will drop down into the tubular sack or conveyer 40 which is carried by the frame 20 and will pass to the outlet end of the sack. As soon as pressure is removed from the handle 39, the spring 41 carried by the pivot pin 31 and connected with the jaws will cause the jaws to return to the normal position, thus opening the jaws and returning the apparatus to its normal position. The gatherer can then be moved to engage another fruit and the process repeated until all of the fruit on the tree has been gathered.

It will thus be seen that a fruit gatherer has been provided which is very simple in construction and which operates very efficiently.

What is claimed is:

1. A fruit gatherer comprising a handle, upper and lower shoulders extending from said handle, a frame formed from a strand of wire bent to assume a U-shape and having its arms bent downwardly and then toward each other and having their free ends bent to form fingers mounted in said lower shoulder, a brace formed from a strand of wire having its inner end portion double and bent to form a finger extending into said upper shoulder and having its outer end portion bent to form an eye through which one of the arms of said frame passes, a receptacle carried by said frame, cutting means carried by said handle and extending above said frame, and operating means for said cutting means.

2. A fruit gatherer comprising a handle, a frame carried by said handle, cutting means carried by said handle and comprising a pair of jaws pivotally connected together at one end and having their inner edges sharpened adjacent the pivoted ends of said jaws and being then carried in diverging relation, the jaws being then carried substantially parallel and having their end portions bent downwardly, the end portion of one of said jaws being secured to said handle, actuating means connected with the free end of the other of said jaws, and means for normally holding said jaws in an open position.

In testimony whereof I affix my signature in presence of two witnesses.

THOMAS M. RANEY.

Witnesses:
 THOMAS F. O'MAHONEY,
 JAMES T. HOGAN.

Copies of this patent may be obtained for five cents each, by addressing the "Commissioner of Patents, Washington, D. C."